US012591315B2

(12) United States Patent　　　　(10) Patent No.:　US 12,591,315 B2
Naitou　　　　　　　　　　　　　　　　(45) Date of Patent:　　Mar. 31, 2026

(54) DISPLAY DEVICE, DISPLAY METHOD, AND PROGRAM

(71) Applicant: Sharp NEC Display Solutions, Ltd., Tokyo (JP)

(72) Inventor: Michitaka Naitou, Tokyo (JP)

(73) Assignee: SHARP NEC DISPLAY SOLUTIONS, LTD., Tokyo (JP)

( * ) Notice: Subject to any disclaimer, the term of this patent is extended or adjusted under 35 U.S.C. 154(b) by 0 days.

(21) Appl. No.: 18/392,913

(22) Filed: Dec. 21, 2023

(65) Prior Publication Data

US 2024/0126380 A1　　Apr. 18, 2024

Related U.S. Application Data

(63) Continuation of application No. PCT/JP2021/026269, filed on Jul. 13, 2021.

(51) Int. Cl.
G06F 3/023　　　　(2006.01)
(52) U.S. Cl.
CPC ................................. G06F 3/0236 (2013.01)
(58) Field of Classification Search
CPC ..... G06F 3/0236; G06F 3/0489; G06F 3/0233
See application file for complete search history.

(56) References Cited

U.S. PATENT DOCUMENTS

2008/0068227 A1* 3/2008 Ogasawara ......... G06F 3/04886
　　　　　　　　　　　　　　　　　　　　　341/23
2020/0134168 A1* 4/2020 Hwang ................... G06F 21/36

FOREIGN PATENT DOCUMENTS

| JP | H 07-322358 A | 12/1995 |
|---|---|---|
| JP | 2004-153570 A | 5/2004 |
| JP | 2008-077159 A | 4/2008 |
| JP | 2011-053979 A | 3/2011 |
| JP | 2012-182606 A | 9/2012 |
| JP | 2014-044644 A | 3/2014 |

OTHER PUBLICATIONS

International Search Report in PCT/JP2021/026269 dated Oct. 5, 2021 with English translation thereof.

* cited by examiner

*Primary Examiner* — Amit Chatly
(74) *Attorney, Agent, or Firm* — McGinn IP Law Group, PLLC

(57)　　　　　　　ABSTRACT

A display device includes a display processing unit configured to display character input buttons, each of which is assigned a plurality of characters, and an order designation button for designating the order of a character capable of being input among the characters assigned to the character input button, an order designation unit configured to designate the order of the character capable of being input among the characters assigned to the character input button every time a button corresponding to the order designation button among buttons on an operation terminal is pressed, and an input character acquisition unit configured to acquire the character corresponding to the order designated by the order designation unit among the characters assigned to the character input button corresponding to the pressed button as an input character when the button corresponding to the character input button among the buttons on the operation terminal is pressed.

11 Claims, 7 Drawing Sheets

FIG. 4

| CHARACTER INPUT BUTTON 22 OF INPUT SCREEN 20 | NUMERIC BUTTON 34 OF REMOTE CONTROLLER 30 | CHARACTER CAPABLE OF BEING INPUT | | | |
|---|---|---|---|---|---|
| | | FIRST | SECOND | THIRD | FOURTH |
| 1ABC BUTTON | 1-BUTTON | 1 | A | B | C |
| 2DEF BUTTON | 2-BUTTON | 2 | D | E | F |
| 3GHI BUTTON | 3-BUTTON | 3 | G | H | I |
| 4JKL BUTTON | 4-BUTTON | 4 | J | K | L |
| 5MNO BUTTON | 5-BUTTON | 5 | M | N | O |
| 6PQR BUTTON | 6-BUTTON | 6 | P | Q | R |
| 7STU BUTTON | 7-BUTTON | 7 | S | T | U |
| 8VWX BUTTON | 8-BUTTON | 8 | V | W | X |
| 9YZ@ BUTTON | 9-BUTTON | 9 | Y | Z | @ |
| 0.-_ BUTTON | 0-BUTTON | 0 | . | - | _ |

FIG. 5

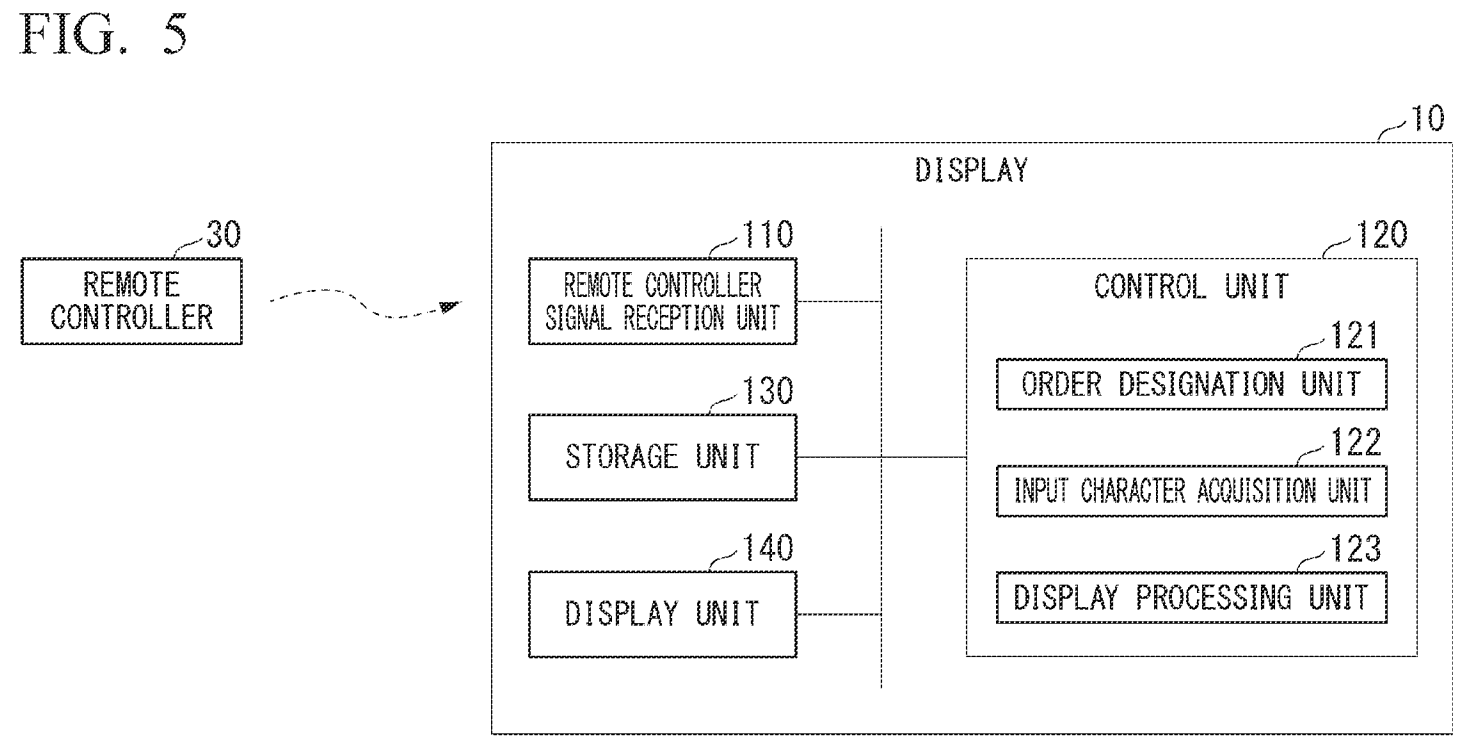

10 DISPLAY

120 CONTROL UNIT
121 ORDER DESIGNATION UNIT
122 INPUT CHARACTER ACQUISITION UNIT
123 DISPLAY PROCESSING UNIT

110 REMOTE CONTROLLER SIGNAL RECEPTION UNIT
130 STORAGE UNIT
140 DISPLAY UNIT

30 REMOTE CONTROLLER

DISPLAY DEVICE, DISPLAY METHOD, AND PROGRAM

TECHNICAL FIELD

The present invention relates to a display device, a display method, and a program.

BACKGROUND ART

Conventionally, in an on-screen menu (for example, a setting menu or the like) displayed by a display device such as a projector or a display, a software keyboard is used, for example, for a character input process. A user can input characters by operating the software keyboard using a remote controller.

For example, in the following Patent Document 1, technology for inputting characters by operating a remote controller to move a cursor to a desired input key when inputting characters with a software keyboard displayed on a video device is disclosed.

CITATION LIST

Patent Document

[Patent Document 1]
Japanese Unexamined Patent Application, First Publication No. 2012-182606

SUMMARY OF INVENTION

Technical Problem

However, as in the technology of Patent Document 1, it is troublesome for a user to move a cursor to a desired input key by operating a remote controller when inputting characters. Also, it may be difficult to display a software keyboard according to performance of the display device.

In view of the above-described problems, an objective of the present invention is to provide a display device, a display method, and a program with which characters can be easily input with an operation terminal without using a software keyboard in a display device.

Solution to Problem

In order to solve the above-described problems, according to an aspect of the present invention, there is provided a display device including: a display processing unit configured to display character input buttons, each of which is assigned a plurality of characters, and an order designation button for designating the order of a character capable of being input among the characters assigned to the character input button; an order designation unit configured to designate the order of the character capable of being input among the characters assigned to the character input button every time a button corresponding to the order designation button among buttons on an operation terminal is pressed; and an input character acquisition unit configured to acquire the character corresponding to the order designated by the order designation unit among the characters assigned to the character input button corresponding to the pressed button as an input character when the button corresponding to the character input button among the buttons on the operation terminal is pressed.

According to an aspect of the present invention, there is provided a display method including: a display processing process in which a display processing unit displays character input buttons, each of which is assigned a plurality of characters, and an order designation button for designating the order of a character capable of being input among the characters assigned to the character input button; an order designation process in which an order designation unit designates the order of the character capable of being input among the characters assigned to the character input button every time a button corresponding to the order designation button among buttons on an operation terminal is pressed; and an input character acquisition process in which an input character acquisition unit acquires the character corresponding to the order designated by the order designation unit among the characters assigned to the character input button corresponding to the pressed button as an input character when the button corresponding to the character input button among the buttons on the operation terminal is pressed.

According to an aspect of the present invention, there is provided a program for causing a computer to function as: a display configured to display character input buttons, each of which is assigned a plurality of characters, and an order designation button for designating the order of a character capable of being input among the characters assigned to the character input button; an order designator configured to designate the order of the character capable of being input among the characters assigned to the character input button every time a button corresponding to the order designation button among buttons on an operation terminal is pressed; and an input character acquisitor configured to acquire the character corresponding to the order designated by the order designator among characters assigned to the character input button corresponding to the pressed button as an input character when the button corresponding to the character input button among the buttons on the operation terminal is pressed.

Advantageous Effects of Invention

According to the present invention, it is possible to easily input characters with an operation terminal without using a software keyboard in a display device.

BRIEF DESCRIPTION OF DRAWINGS

FIG. 4 is a diagram showing relationships between character input buttons, numeric buttons, and characters capable of being input according to the embodiment of the present invention.

FIG. 5 is a block diagram showing an example of a configuration of a display according to the embodiment of the present invention.

DESCRIPTION OF EMBODIMENTS

Hereinafter, an embodiment of the present invention will be described in detail with reference to the drawings.

<1. Outline of Display>

Figure 1:
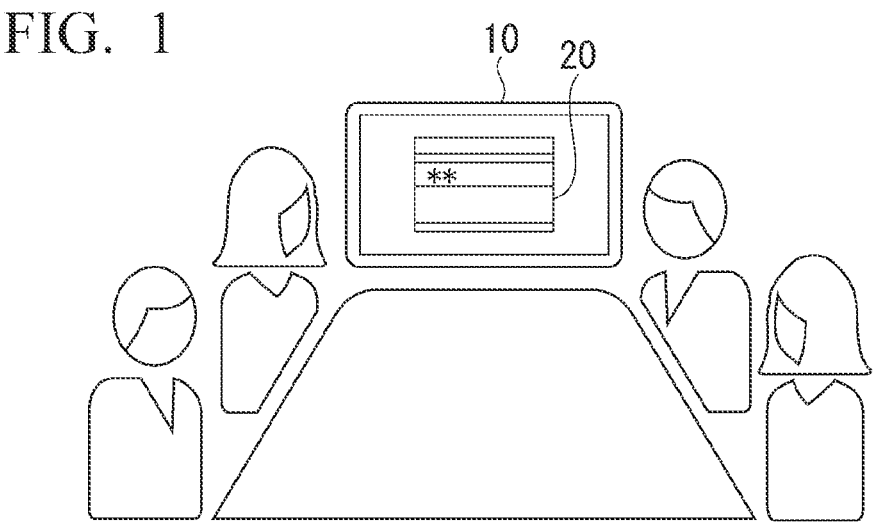
FIG. 1 is a diagram for describing an outline of a display according to an embodiment of the present invention.

First, an outline of a display according to an embodiment of the present invention will be described with reference to FIGS. 1 to 4. FIG. 1 is a diagram showing the outline of the display according to the embodiment of the present invention.

FIG. 1 shows a display 10 as an example of a display device according to the present embodiment. The display 10 is, for example, a public display, a digital signage display, a display of a personal computer (PC), a television, or the like.

In the example shown in FIG. 1, a plurality of people are present at positions where they can see what is displayed on the display 10. In this way, the display 10 can be considered to be used not only by individuals but also by an unspecified number of people. In particular, a public display and a digital signage display are provided at positions where an unspecified number of people can see what is being displayed.

The display 10 displays, for example, a video (a still image or a moving image) input from an external terminal or an on-screen display (OSD). The on-screen display is a screen for setting the display 10. When a video is already displayed, the display 10 displays the on-screen display superimposed on the video. In FIG. 1, an example in which a password input screen 20 is displayed as an example of the on-screen display on the display 10 is shown.

Figure 2:
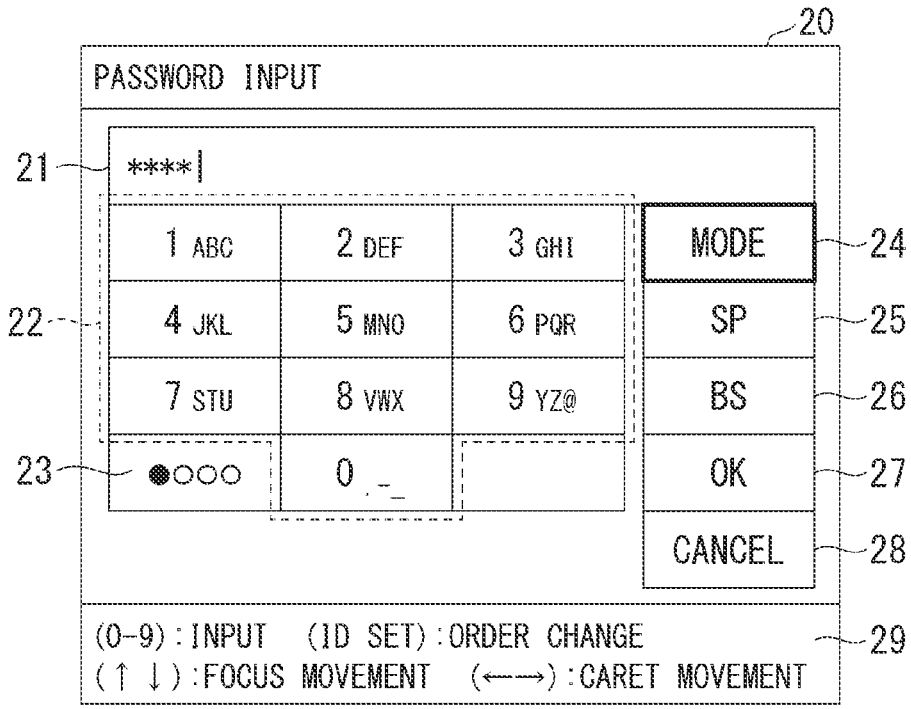
FIG. 2 is a diagram showing an example of an input screen according to the embodiment of the present invention.

Here, an example of the input screen 20 according to the embodiment of the present invention will be described with reference to FIG. 2. FIG. 2 is a diagram showing an example of the input screen 20 according to the embodiment of the present invention.

The input screen 20 shown in FIG. 2 has an input field 21, character input buttons 22, an order designation button 23, a MODE button 24, an SP button 25, a BS button 26, an OK button 27, a CANCEL button 28, and an input guide field 29.

Also, a screen configuration of the input screen 20 is not limited to this example. For example, the screen configuration of the input screen 20 may be a configuration corresponding to a type of screen.

The input field 21 is a field for displaying input characters. As an example, "**" is displayed as the input characters in the input field 21**.

Also, because the input screen 20 shown in FIG. 2 is a password input screen, an input password is preferably displayed in the input field 21 so that the password is not known to a third party who sees the screen. Therefore, in the present embodiment, the input field 21 does not directly display an actually input character, but displays a symbol (for example, *) indicating that the character has been input.

The character input button 22 is a button for inputting characters. In the present embodiment, a plurality of buttons are provided as the character input buttons 22. For example, as shown in FIG. 2, ten buttons such as a 1ABC button, a 2DEF button, a 3GHI button, a 4JKL button, a 5MNO button, a 6PQR button, a 7STU button, an 8VWX button, a 9YZ@ button, and a 0.-_ button are provided.

A plurality of characters are assigned to each button of the character input buttons 22. For example, a plurality of characters arranged in sequence are assigned to each button of the character input buttons 22. Specifically, in the example shown in FIG. 2, a plurality of characters are assigned to one button in a horizontal row.

A character assigned to each button of the character input buttons 22 is a character capable of being input with each button. Characters capable of being input are displayed on each button of the character input buttons 22. For example, 1ABC is displayed on the 1ABC button. This indicates that four characters, 1, A, B, and C, can be input with the one 1ABC button. Also, the order in which the assigned characters can be input is indicated on each button of the character input buttons 22. For example, the display of 1ABC on the 1ABC button indicates that the characters can be input in the order of 1, A, B, and C.

When the display 10 recognizes that any one of the character input buttons 22 has been pressed, a character corresponding to the designated order among the characters assigned to the pressed button is input to the input field 21.

Also, the method of assigning a plurality of characters for one button is not limited to a method of arranging the characters in a horizontal row. For example, the method of assigning a plurality of characters for one button may be a cross-shaped assignment method like a key with which a flick input operation can be performed on a smartphone, a tablet terminal, or the like. Specifically, characters are assigned to either the center of the cross or the up, down, left, or right direction of the cross.

Also, the number of characters assigned to one button is not limited to four and may be any number of characters. For example, when a plurality of characters are assigned to one button in a cross shape, a maximum of five characters may be assigned.

The order designation button 23 is a button for designating the order of a character capable of being input among the characters assigned to the character input button 22. When it is recognized that the order designation button 23 has been pressed, the display 10 designates the order next to the currently designated order of a character capable of being input as the order of a character capable of being input.

The currently designated order of a character capable of being input is displayed on the order designation button 23. For example, in the example shown in FIG. 2, "●○○○" is displayed on the order designation button 23. Marks "●" and "○" are used for visualizing the order of a character capable of being input at present and marks equal in number to characters assigned to the character input button 22 are displayed on the order designation button 23. "●" indicates the order of a character capable of being input at present that has been designated. On the other hand, "○" indicates the order of a character capable of being input at present that has not been designated. In the example shown in FIG. 2, because four characters are assigned to the character input buttons 22 in a horizontal row, a total of four characters "●" and "○" are displayed in a horizontal row. In the example shown in FIG. 2, a first mark is "●." That is, the display of the order designation button 23 shown in FIG. 2 indicates that the order of a character capable of being input is designated as the first. In this case, when it is recognized that one of the character input buttons 22 has been pressed, the display 10 inputs the first character of the plurality of characters assigned to the pressed button to the input field 21.

Also, the display of the order designation button 23 is not limited to the example shown in FIG. 2. For example, in the display of the order designation button 23, "●" may indicate the order of a character capable of being input at present that has not been designated and "○" may indicate the order of a character capable of being input at present that has been designated.

Also, when a plurality of characters are arranged in a cross shape and assigned to one button, "●" and "○" may be arranged and displayed in a cross shape on the order designation button 23.

The MODE button 24 is a button for changing types of characters capable of being input. The types of characters are, for example, numbers, alphabets (capital letters and small letters), hiragana, katakana, and the like.

Although numbers and alphabets are combined into one type in the present embodiment, the present invention is not limited to such an example. For example, numbers and alphabets may be of separate types.

As an example, when it is recognized that the MODE button 24 has been pressed, the display 10 changes the type of characters capable of being input from numbers/alphabets (capital letters) to numbers/alphabets (small letters).

The SP button 25 is a button for inputting a space (a blank).

The BS button 26 is a button for erasing a character immediately before a caret.

The OK button 27 is a button for deciding on an input of a password.

The CANCEL button 28 is a button for canceling an input of a password.

The input guide field 29 is a field for displaying the description of the process executed when a button on the operation terminal is pressed. A user can operate the on-screen display by, for example, operating a button provided on the display 10 or an operation terminal. The operation terminal is, for example, a remote controller. In the present embodiment, an example in which the user operates the remote controller to input characters (a password) on the input screen 20 displayed on the display 10 will be described.

In the input guide field 29 shown in FIG. 2, "(0 to 9): input," "(ID SET): order change," "(↑↓): focus movement," and "(←→): caret movement" are displayed as an example.

"(0 to 9): input" indicates that characters are input by pressing the numeric buttons from 0 to 9 on the remote controller.

"(ID SET): order change" indicates that pressing the ID SET button on the remote controller changes the order of the character capable of being input.

"(↑↓): focus movement" indicates that the focus moves in the direction of the pressed button when the ↑ button or the ↓ button on the remote controller is pressed.

"(←→): caret movement" indicates that pressing the ← button or the → button on the remote controller moves the caret in the direction of the pressed button.

Figure 3:
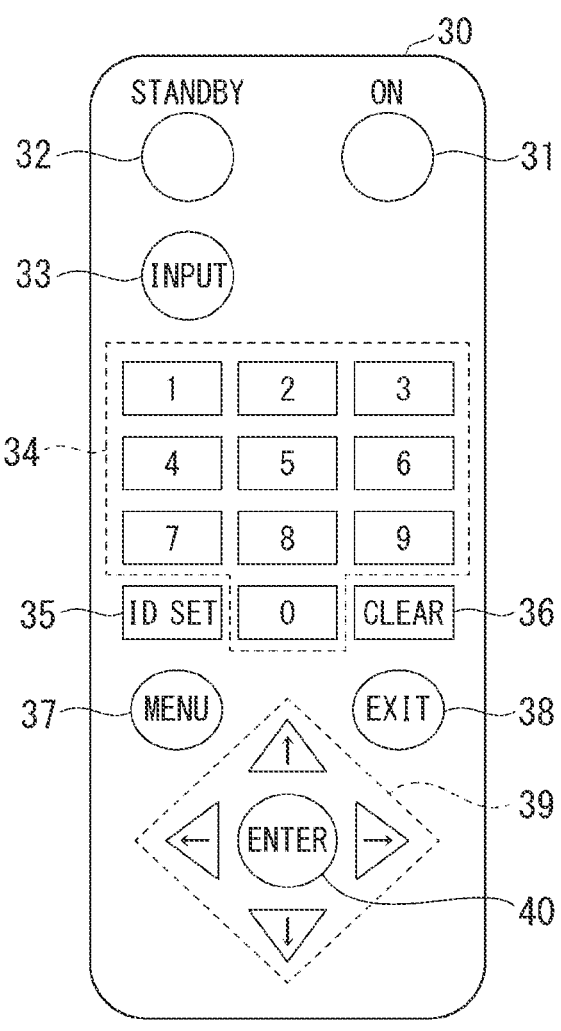
FIG. 3 is a diagram showing an example of an operation terminal according to the embodiment of the present invention.

Now, the operation terminal according to the embodiment of the present invention will be described with reference to FIG. 3. FIG. 3 is a diagram showing an example of the operation terminal according to the embodiment of the present invention. In FIG. 3, a remote controller 30 is shown as an example of the operation terminal.

The remote controller 30 shown in FIG. 3 has an ON button 31, a STANDBY button 32, an INPUT button 33, numeric buttons 34, an ID SET button 35, a CLEAR button 36, a MENU button 37, an EXIT button 38, direction buttons 39, and an ENTER button 40.

Also, a button configuration of the remote controller 30 is not limited to the present example. For example, the button configuration of the remote controller 30 may be configured according to a model of the display 10 or a model of the remote controller 30.

The ON button 31 is a button for turning on or off a power supply of the display 10.

The STANDBY button 32 is a button for putting the display 10 in a standby state.

The INPUT button 33 is a button for switching a signal input.

The numeric buttons 34 are buttons for inputting characters. In the present embodiment, a plurality of buttons are provided as the numeric buttons 34. For example, as shown in FIG. 3, ten buttons, i.e., a 1-button, a 2-button, a 3-button, a 4-button, a 5-button, a 6-button, a 7-button, an 8-button, a 9-button, and a 0-button, are provided.

The ID SET button 35 is a button for changing the order of a character capable of being input.

The CLEAR button 36 is a button for erasing the input characters.

The MENU button 37 is a button for showing or hiding the on-screen display.

The EXIT button 38 is a button for hiding the on-screen display or a button for returning the display from the on-screen display to the previous screen.

The direction button 39 is a button for moving the focus or caret. In the present embodiment, a plurality of buttons are provided as the direction buttons 39. For example, as shown in FIG. 3, four buttons, i.e., the ↑ button, the ↓ button, the ← button, and the → button, are provided. The ↑ button and the ↓ button are buttons for moving the focus. The ← button and the → button are buttons for moving the caret.

The ENTER button 40 is a button for deciding on the input.

In the present embodiment, the buttons on the input screen 20 and the buttons on the remote controller 30 are associated with each other. Thereby, when the user presses the button on the remote controller 30, the display 10 can recognize that the button on the input screen 20 associated with the pressed button has been pressed.

For example, the character input buttons 22 on the input screen 20 and the numeric buttons 34 on the remote controller 30 are associated with each other. Specifically, the 1ABC button of the character input buttons 22 is associated with the 1-button of the numeric buttons 34. Likewise, the 2DEF button, the 3GHI button, the 4JKL button, the 5MNO button, the 6PQR button, the 7STU button, the 8VWX button, the 9YZ@ button, and the 0.-_ button are associated with the 2-button, the 3-button, the 4-button, the 5-button, the 6-button, the 7-button, the 8-button, the 9-button, and the 0-button of the numeric buttons 34, respectively. As an example, when the user presses the 1-button of the numeric buttons 34, the display 10 recognizes that the 1ABC button associated with the 1-button has been pressed. Also, the display 10 inputs a character corresponding to the designated order among the characters capable of being input that are assigned to the 1ABC button to the input field 21. The same is also true for a case where the other buttons among the numeric buttons 34 are pressed.

Also, the order designation button 23 on the input screen 20 and the ID SET button 35 on the remote controller 30 are associated with each other. Thus, when the user presses the ID SET button 35 on the remote controller 30, the display 10 recognizes that the order designation button 23 associated with the ID SET button 35 has been pressed. Also, the display 10 designates the order next to the currently designated order of a character capable of being input as the order of a character capable of being input.

Here, relationships between the character input buttons 22, the numeric buttons 34, and the characters capable of being input according to the embodiment of the present invention will be described with reference to FIG. 4. FIG. 4 is a diagram showing relationships between the character input buttons 22, the numeric buttons 34, and the characters capable of being input according to the embodiment of the present invention. In FIG. 4, corresponding relationships between the character input buttons 22 on the input screen 20 and the numeric buttons 34 on the remote controller 30, the character capable of being input assigned to each corresponding relationship, and the order thereof are shown.

As shown in FIG. 4, in the present embodiment, the 1ABC button of the character input buttons 22 is associated with the 1-button of the numeric buttons 34. For the 1ABC button and the 1-button, "1" is assigned as a first character capable of being input, "A" is assigned as a second character capable of being input, "B" is assigned as a third character capable of being input, and "C" is assigned as a fourth character capable of being input.

Also, the 2DEF button of the character input buttons 22 is associated with the 2-button of the numeric buttons 34. For the 2DEF button and the 2-button, "2" is assigned as a first character capable of being input, "D" is assigned as a second character capable of being input, "E" is assigned as a third character capable of being input, and "F" is assigned as a fourth character capable of being input.

Also, the 3GHI button of the character input buttons 22 is associated with the 3-button of the numeric buttons 34. For the 3GHI button and the 3-button, "3" is assigned as a first character capable of being input, "G" is assigned as a second character capable of being input, "H" is assigned as a third character capable of being input, and "I" is assigned as a fourth character capable of being input.

Also, the 4JKL button of the character input buttons 22 is associated with the 4-button of the numeric buttons 34. For the 4JKL button and the 4-button, "4" is assigned as a first character capable of being input, "J" is assigned as a second character capable of being input, "K" is assigned as a third character capable of being input, and "L" is assigned as a fourth character capable of being input.

Also, the 5MNO button of the character input buttons 22 is associated with the 5-button of the numeric buttons 34. For the 5MNO button and the 5-button, "5" is assigned as a first character capable of being input, "M" is assigned as a second character capable of being input, "N" is assigned as a third character capable of being input, and "O" is assigned as a fourth character capable of being input.

Also, the 6PQR button of the character input buttons 22 is associated with the 6-button of the numeric buttons 34. For the 6PQR button and the 6-button, "6" is assigned as a first character capable of being input, "P" is assigned as a second character capable of being input, "Q" is assigned as a third character capable of being input, and "R" is assigned as a fourth character capable of being input.

Also, the 7STU button of the character input buttons 22 is associated with the 7-button of the numeric buttons 34. For the 7STU button and the 7-button, "7" is assigned as a first character capable of being input, "S" is assigned as a second character capable of being input, "T" is assigned as a third character capable of being input, and "U" is assigned as a fourth character capable of being input.

Also, the 8VWX button of the character input buttons 22 is associated with the 8-button of the numeric buttons 34. For the 8VWX button and the 8-button, "8" is assigned as a first character capable of being input, "V" is assigned as a second character capable of being input, "W" is assigned as a third character capable of being input, and "X" is assigned as a fourth character capable of being input.

Also, the 9YZ@ button of the character input buttons 22 is associated with the 9-button of the numeric buttons 34. For the 9YZ@ button and the 9-button, "9" is assigned as a first character capable of being input, "Y" is assigned as a second character capable of being input, "Z" is assigned as a third character capable of being input, and "@" is assigned as a fourth character capable of being input.

Also, the 0.-_ button of the character input buttons 22 is associated with the 0-button of the numeric buttons 34. For the 0.-_ button and the 0-button, "0" is assigned as a first character capable of being input, "." is assigned as a second character capable of being input, "-" is assigned as a third character capable of being input, and "_" is assigned as a fourth character capable of being input.

In the example shown in FIG. 4, when the order of a character capable of being input is designated as the first, the user can input any one of "0 to 9" by pressing any one of the 0- to 9-buttons of the numeric buttons 34 on the remote controller 30.

Also, when the order of a character capable of being input is designated as the second, the user can input any character of "A, D, G, J, M, P, S, V, Y, and ." by pressing any one of the 0- to 9-buttons of the numeric buttons 34 on the remote controller 30.

Also, when the order of a character capable of being input is designated as the third, the user can input any character of "B, E, H, K, N, Q, T, W, Z, and -" by pressing any one of the 0- to 9-buttons of the numeric buttons 34 on the remote controller 30.

Also, when the order of a character capable of being input is designated as the fourth, the user can input any character of "C, F, I, L, O, R, U, X, @, and _" by pressing any one of the 0- to 9-buttons of the numeric buttons 34 on the remote controller 30.

As can be seen from FIGS. 2 and 3, the display 10 displays the character input buttons 22 and the order designation button 23 on the input screen 20 in an arrangement similar to that of the numeric buttons 34 and the ID SET button 35 on the remote controller 30. Thereby, the user can intuitively operate the remote controller 30 when inputting characters by operating the remote controller 30 and can easily input characters.

<2. Configuration of Display>

The outline of the display according to the embodiment of the present invention has been described above. Next, a configuration of the display according to the embodiment of the present invention will be described with reference to FIG. 5.

FIG. 5 is a block diagram showing an example of the configuration of the display according to the present embodiment. As shown in FIG. 5, the display 10 includes a remote controller signal reception unit 110, a control unit 120, a storage unit 130, and a display unit 140.

(1) Remote Controller Signal Reception Unit 110

The remote controller signal reception unit 110 has a function of receiving a signal from the remote controller 30. For example, the remote controller signal reception unit 110 receives a control signal for controlling an operation of the display 10 from the remote controller 30. Examples of control signals include an order designation signal and a character input signal.

The order designation signal is a signal indicating the execution of a process of designating the order of a character capable of being input. The order designation signal, for example, is transmitted from the remote controller 30 when the user presses the ID SET button 35 on the remote controller 30.

The character input signal is a signal indicating the execution of a process for inputting characters capable of being input. The character input signal, for example, is transmitted from the remote controller 30 when the user presses any one of the numeric buttons 34 on the remote controller 30.

Also, the signal transmitted by the remote controller 30 may be a signal indicating which of the buttons on the remote controller 30 has been pressed. In this case, a control signal may be generated on the display 10 side in accordance with the pressed button on the basis of the signal received from the remote controller 30 by the remote controller signal reception unit 110. For example, when the remote controller signal reception unit 110 receives a signal indicating that the ID SET button 35 has been pressed, the display 10 generates an order designation signal. Also, when the remote controller signal reception unit 110 receives a signal indicating that any one of the numeric buttons 34 has been pressed, the display 10 generates a character input signal.

(2) Control Unit 120

The control unit 120 has a function of controlling an overall operation of the display 10. The control unit 120 is implemented, for example, by causing a central processing unit (CPU) provided as hardware in the display 10 to execute a program.

As shown in FIG. 5, the control unit 120 includes an order designation unit 121, an input character acquisition unit 122, and a display processing unit 123.

(2-1) Order Designation Unit 121

The order designation unit 121 has a function of designating the order of a character capable of being input. For example, the order designation unit 121 designates the order of a character capable of being input among the characters assigned to the character input button 22 every time a button on the remote controller 30 corresponding to the order designation button 23 on the input screen 20 is pressed. In the case of the present embodiment, the order designation unit 121 sequentially designates the first to fourth characters capable of being input every time the ID SET button 35 among the buttons on the remote controller 30 is pressed.

(2-2) Input Character Acquisition Unit 122

The input character acquisition unit 122 has a function of acquiring input characters. For example, when a button on the remote controller 30 corresponding to the character input button 22 on the input screen 20 is pressed, the input character acquisition unit 122 acquires a character corresponding to the order designated by the order designation unit 121 among the characters assigned to the character input button 22 corresponding to the pressed button as the input character. In the case of the present embodiment, when any one of the numeric buttons 34 among the buttons on the remote controller 30 is pressed, the input character acquisition unit 122 acquires a character corresponding to the currently designated order of a character capable of being input among the characters assigned to the character input button 22 corresponding to the pressed numeric button 34 as the input character.

(2-3) Display Processing Unit 123

The display processing unit 123 has a function of controlling display processing on the display 10. For example, the display processing unit 123 displays an on-screen display. Specifically, the display processing unit 123 displays the on-screen display on the display 10 when the user has performed an operation of displaying the on-screen display (for example, the user has pressed the MENU button 37) with the remote controller 30. As an example, the display processing unit 123 displays the password input screen 20 having fields and buttons described with reference to FIG. 2.

Also, the display processing unit 123 displays the order of a character capable of being input designated by the order designation unit 121. For example, the display processing unit 123 displays the currently designated order of characters capable of being input on the order designation button 23 on the input screen 20. As an example, the display processing unit 123 displays "●○○○" on the order designation button 23 as shown in FIG. 2. This indicates that the order of a character capable of being input is designated as the first. When it is indicated that the order of a character capable of being input is designated as the second, the display processing unit 123 displays "○●○○" on the order designation button 23. When it is indicated that the order of a character capable of being input is designated as the third, the display processing unit 123 displays "○○●○" on the order designation button 23. When the order of a character capable of being input is designated as the fourth, the display processing unit 123 displays "○○○●" on the order designation button 23.

Also, the display of the currently designated order of a character capable of being input is not limited to the present example. For example, the currently designated order of a character capable of being input may be similarly displayed by symbols other than ○ and ● (for example, triangles and squares) or may be displayed using numbers.

Also, the display processing unit 123 displays a character corresponding to the designated order among the characters assigned to the character input buttons 22 in accordance with the order of a character capable of being input being designated by the order designation unit 121. Thereby, the user can ascertain the currently designated character capable of being input.

For example, when the order designation unit 121 designates the order of a character capable of being input as the first, the display processing unit 123 displays the characters "0 to 9" set as the first characters on the corresponding character input buttons 22.

Also, when the order designation unit 121 designates the order of a character capable of being input as the second, the display processing unit 123 displays the characters "A, D, G, J, M, P, S, V, Y, and ." set as the second characters on the corresponding character input buttons 22.

Also, when the order designation unit 121 designates the order of a character capable of being input as the third, the display processing unit 123 displays the character "B, E, H, K, N, Q, T, W, Z, and -" set as the third character on the corresponding character input buttons 22.

Also, when the order designation unit 121 designates the order of a character capable of being input as the fourth, the display processing unit 123 displays the characters "C, F, I, L, O, R, U, X, @, and _" set as the fourth characters on the corresponding character input buttons 22.

Also, when a button on the remote controller 30 corresponding to the order designation button 23 is pressed, the display processing unit 123 displays a character corresponding to the designated order among the characters assigned to the character input button 22 for each of the plurality of character input buttons 22. Specifically, when the order designation button 23 is pressed, the display processing unit 123 changes the character capable of being input at present from the character displayed on the character input button 22 to the character corresponding to the order designated as the order of a character capable of being input the next time for each of the plurality of character input buttons 22. That is, when the order designation button 23 is pressed, the display processing unit 123 changes the display of all character input buttons 22 in cooperation.

Also, the display processing unit 123 may display all characters assigned to each of the character input buttons 22 in advance on each button, as shown in FIG. 2. In this case, the display processing unit 123 changes a display mode of a character corresponding to the designated order among the characters displayed on the character input button 22 in accordance with the designation of the order of the character capable of being input by the order designation unit 121. For example, as shown in FIG. 2, the display processing unit 123 displays a character corresponding to the designated order larger than other characters. Also, the display processing unit 123 may display a character corresponding to the designated order thicker than the other characters or in a color different from those of the other characters.

In this way, the display processing unit 123 changes only a display mode of the character corresponding to the designated order. Thereby, even if all characters assigned to each button of the character input buttons 22 are displayed, the user can identify a character capable of being input.

Also, when the button on the remote controller 30 corresponding to the character input button 22 is pressed, the display processing unit 123 displays a symbol indicating that the character has been input in the character input field 21 without changing the display mode of the character input button 22 corresponding to the pressed button. The symbol indicating that the character has been input is, for example, "*." That is, the display processing unit 123 does not directly display the input characters, but displays characters different from the actually input characters. Thereby, even if an unspecified number of people can see the password input screen 20 displayed on the display 10 as shown in FIG. 1, it is possible to prevent the characters input by the user from being known to a third party.

Examples of a method of changing the display mode include focusing on the character input button 22, blinking the character input button 22, and changing the color of the character input button 22. If the display mode of the character input button 22 corresponding to the pressed button is changed in this way, there is a risk that the input character will be known to a third party even if the input character is not directly displayed but is displayed as a symbol. For example, as shown in FIG. 1, when an unspecified number of people can see the password input screen 20 displayed on the display 10, it is assumed that the display mode of the character input button 22 corresponding to the pressed button is changed. In this case, an unspecified number of people can ascertain which character has been input as the character of the password by confirming the character input button 22 whose display mode has changed. Thus, if the display mode of the character input button 22 corresponding to the pressed button is changed, the password may be stolen and used illegally by an unspecified number of people.

Therefore, without changing the display mode of the character input button 22 corresponding to the button pressed by the display processing unit 123, it is possible to prevent passwords from being stolen by an unspecified number of people and from being illegally used even if an unspecified number of people can see the password input screen 20 displayed on the display 10.

(3) Storage Unit 130

The storage unit 130 includes storage media such as a hard disk drive (HDD), a solid-state drive (SSD), a flash memory, an electrically erasable programmable read-only memory (EEPROM), a random access read/write memory (RAM), a read-only memory (ROM), and any combination of these storage media.

The storage unit 130 stores information indicating relationships between the character input buttons 22, the numeric buttons 34, and the characters capable of being input. For example, the storage unit 130 stores information indicating the relationships between the character input buttons 22, the numeric buttons 34, and the numbers/alphabets (capital letters) shown in FIG. 4 as one pattern. The storage unit 130 also stores information indicating relationships between the character input buttons 22, the numeric buttons 34, and numbers/alphabets (small letters), information indicating relationships between the character input buttons 22, the numeric buttons 34, and hiragana, and information indicating relationships between the character input buttons 22, numeric buttons 34, and katakana as other patterns.

(4) Display Unit 140

The display unit 140 has a function of displaying a video. The display unit 140 is implemented by, for example, a liquid crystal display (LCD), an organic electroluminescence (EL) display, or the like. The display unit 140 displays a video on the basis of a video signal input from the display processing unit 123.

<3. Processing Flow>

Figure 6:
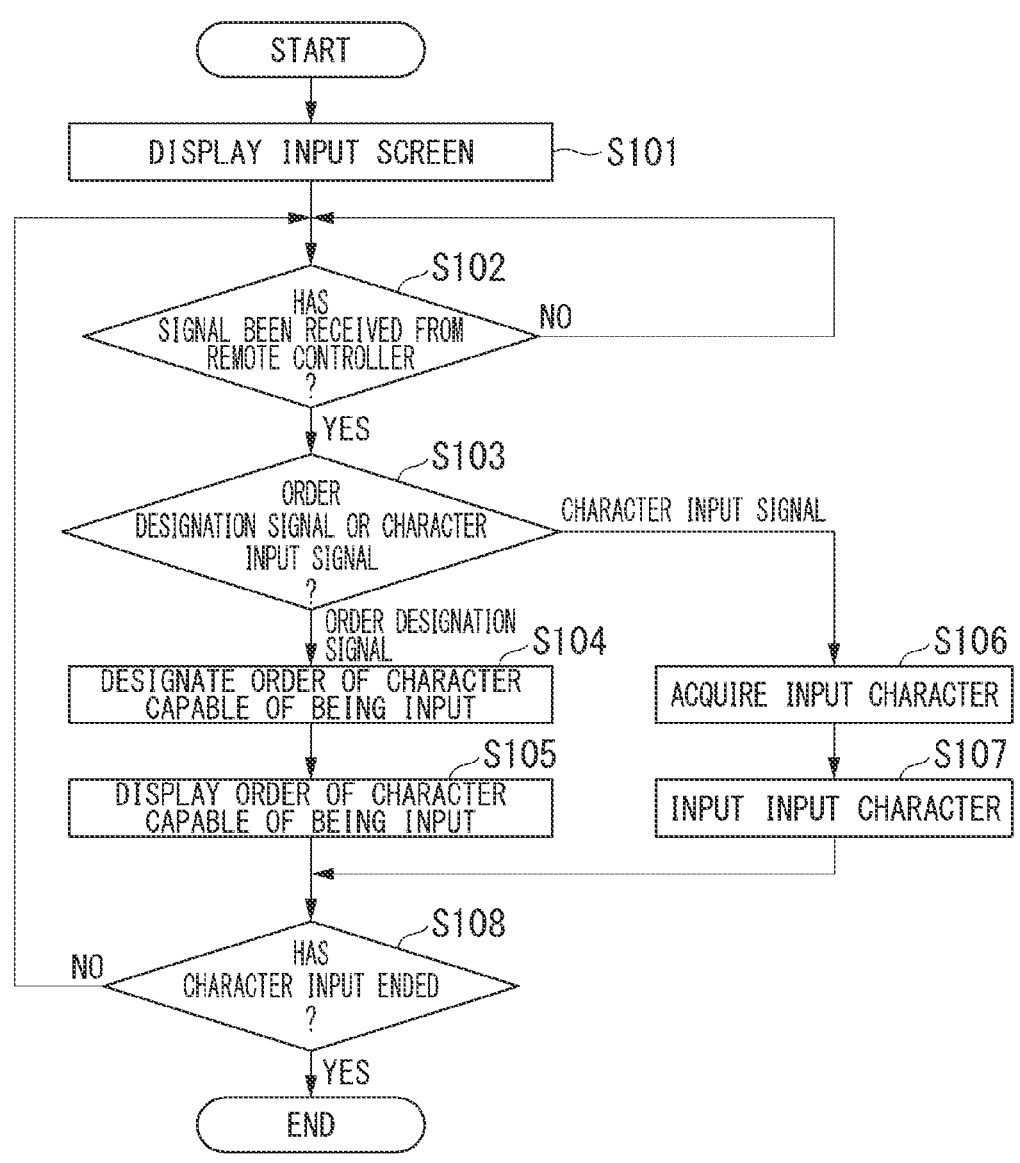
FIG. 6 is a flowchart showing an example of a flow of a process of the display according to the embodiment of the present invention.

The configuration of the display 10 according to the embodiment of the present invention has been described above. Next, a flow of a process according to the embodiment of the present invention will be described with reference to FIG. 6. FIG. 6 is a flowchart showing an example of a flow of a process of the display 10 according to the present embodiment. In FIG. 6, an example of a character input process is shown.

As shown in FIG. 6, first, the display processing unit 123 of the display 10 displays the input screen 20 on the display unit 140 (step S101).

It is confirmed whether or not the remote controller signal reception unit 110 of the display 10 has received a signal from the remote controller 30 (step S102). When the remote controller signal reception unit 110 has received a signal from the remote controller 30 (step S102/YES), the process proceeds to step S103. On the other hand, when the remote controller signal reception unit 110 has not received a signal from the remote controller 30 (step S102/NO), step S102 is iterated.

When the process proceeds to step S103, the remote controller signal reception unit 110 confirms whether the received signal is an order designation signal or the character input signal (step S103). When the received signal is the order designation signal (step S103/order designation signal), the process proceeds to step S104. On the other hand, when the received signal is the character input signal (step S103/character input signal), the process proceeds to step S106.

When the process proceeds to step S104, the order designation unit 121 of the display 10 designates the order of a character capable of being input (step S104).

Subsequently, the display processing unit 123 of the display 10 displays the order of a character capable of being input designated by the order designation unit 121 (step S105).

After displaying, the process proceeds to step S108.

When the process proceeds to step S106, the input character acquisition unit 122 of the display 10 acquires an input character (step S106).

Subsequently, the input character acquisition unit 122 inputs the acquired input character to the input field 21 (step S107). At this time, the display processing unit 123 displays the character input to the input field 21 as a symbol (for example, *).

After displaying, the process proceeds to step S108.

When the process proceeds to step S108, the control unit 120 confirms whether or not the character input has ended (step S108). When the character input has ended (step S108/YES), the display 10 ends the process. On the other hand, when the character input has not ended (step S108/NO), the display 10 iterates the process from step S102.

<4. Specific Examples>

Figure 7:
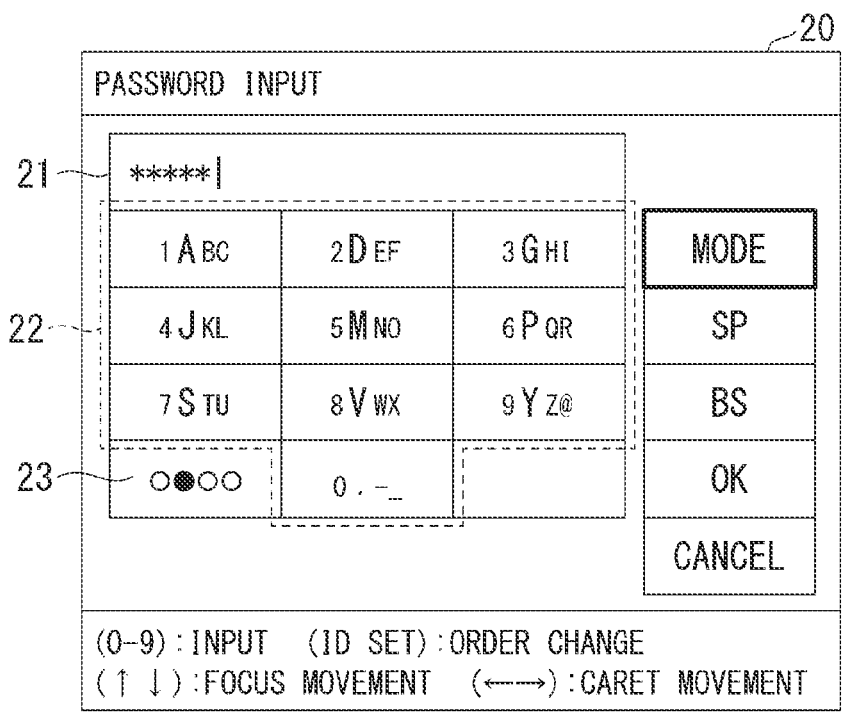
FIG. 7 is a diagram showing an example of an input screen according to the embodiment of the present invention.
Figure 8:
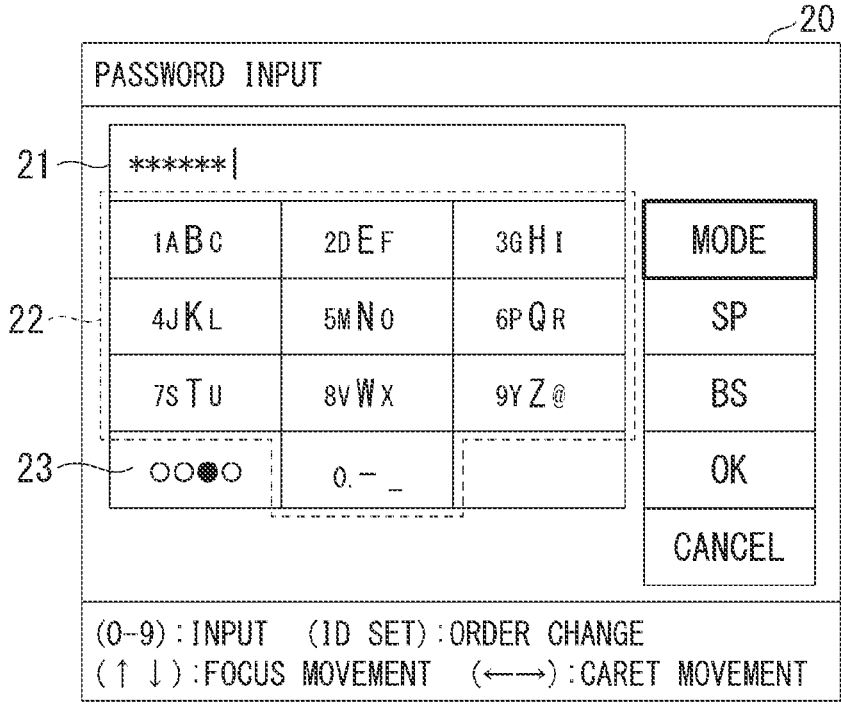
FIG. 8 is a diagram showing an example of an input screen according to the embodiment of the present invention.
Figure 9:
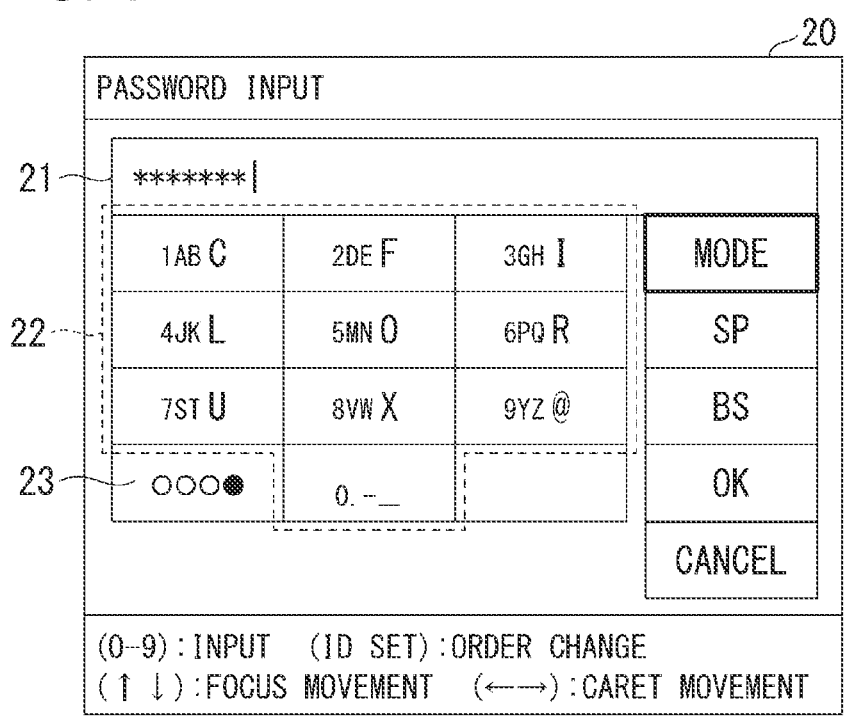
FIG. 9 is a diagram showing an example of an input screen according to the embodiment of the present invention.

A flow of a process of the display 10 according to the embodiment of the present invention has been described above. Next, specific examples of the remote controller operation and the input screen 20 will be described with reference to FIGS. 7 to 9. FIG. 7 to 9 are diagrams showing an example of the input screen 20 according to the present embodiment.

In FIG. 7, when the input screen 20 shown in FIG. 2 is being displayed, the input screen 20 after the user operates the remote controller 30 to change the order of a character capable of being input and then input the character is shown.

When the user presses the ID SET button 35 on the remote controller 30 in a state in which the input screen 20 of FIG. 2 is displayed, the display of the character input buttons 22 is switched like the input screen 20 of FIG. 7. Specifically, because the order of the character capable of being input in the input screen 20 of FIG. 2 is designated as the first, the characters "0 to 9" set as the first characters are displayed to be larger than the other characters. However, because the order of the character capable of being input in the input screen 20 of FIG. 7 is designated as the second, the characters "A, D, G, J, M, P, S, V, Y, and ." set as the second characters are displayed to be larger (more emphasized) than the other characters. Although "●○○○" is displayed on the order designation button 23 in the input screen 20 of FIG. 2, "○●○○" is displayed on the order designation button 23 in the input screen 20 of FIG. 7 when the user has pressed the ID SET button 35 on the remote controller 30.

When the user presses one of the numeric buttons 34 on the remote controller 30 after pressing the ID SET button 35, a character is input to the input field 21 and "*" is displayed to indicate that the character has been input. A fifth symbol "*" is displayed to the input field 21 in the input screen 20 of FIG. 7.

In FIG. 8, when the input screen 20 shown in FIG. 7 is being displayed, the input screen 20 after the user operates the remote controller 30 to change the order of a character capable of being input and then input the character is shown.

When the user presses the ID SET button 35 on the remote controller 30 in a state in which the input screen 20 of FIG. 7 has been displayed, the display of the character input buttons 22 is switched like the input screen 20 of FIG. 8. Specifically, because the order of the character capable of being input in the input screen 20 of FIG. 7 is designated as the second, the characters "A, D, G, J, M, P, S, V, Y, and ." set as the second characters are displayed to be larger than the other characters. However, because the order of the character capable of being input in the input screen 20 of FIG. 8 is designated as the third, the characters "B, E, H, K, N, Q, T, W, Z, and -" set as the third characters are displayed to be larger than the other characters. Although "○●○○" is displayed on the order designation button 23 in the input screen 20 of FIG. 7, "○○●○" is displayed on the order designation button 23 in the input screen 20 of FIG. 8 when the user has pressed the ID SET button 35 on the remote controller 30.

When the user presses one of the numeric buttons 34 on the remote controller 30 after pressing the ID SET button 35, a character is input to the input field 21 and "*" is displayed to indicate that the character has been input. A sixth symbol "*" is displayed to the input field 21 in the input screen 20 of FIG. 8.

In FIG. 9, when the input screen 20 shown in FIG. 8 is being displayed, the input screen 20 after the user operates the remote controller 30 to change the order of a character capable of being input and then input the character is shown.

When the user presses the ID SET button 35 on the remote controller 30 in a state in which the input screen 20 of FIG. 8 has been displayed, the display of the character input buttons 22 is switched like the input screen 20 of FIG. 9. Specifically, because the order of the character capable of being input in the input screen 20 of FIG. 8 is designated as the third, the characters "B, E, H, K, N, Q, T, W, Z, and -" set as the third characters are displayed to be larger than the other characters. However, because the order of the character capable of being input in the input screen 20 of FIG. 9 is designated as the fourth, the characters "C, F, I, L, O, R, U, X, @, and _" set as the fourth characters are displayed to be larger than the other characters. Although "○○●○" is displayed on the order designation button 23 in the input screen 20 of FIG. 8, "○○○●." is displayed on the order designation button 23 in the input screen 20 of FIG. 9 when the user has pressed the ID SET button 35 on the remote controller 30.

When the user presses one of the numeric buttons 34 on the remote controller 30 after pressing the ID SET button 35, a character is input to the input field 21 and "*" is displayed to indicate that the character has been input. A seventh symbol "*" is displayed to the input field 21 in the input screen 20 of FIG. 9.

As described above, the display 10 according to the embodiment of the present invention includes the display processing unit 123, the order designation unit 121, and the input character acquisition unit 122.

The display processing unit 123 displays the character input buttons 22, each of which is assigned a plurality of characters, and the order designation button 23 for designating the order of a character capable of being input among the characters assigned to the character input button 22.

The order designation unit 121 designates the order of the character capable of being input among the characters assigned to the character input button 22 every time the button corresponding to the order designation button 23 among the buttons on the remote controller 30 is pressed.

If the button corresponding to the character input button 22 among the buttons on the remote controller 30 is pressed, the input character acquisition unit 122 acquires a character corresponding to the order designated by the order designation unit 121 among the characters assigned to the character input button 22 corresponding to the pressed button as the input character.

With such a configuration, the user can input characters using the remote controller 30 without using a software keyboard by operating the buttons on the remote controller 30 corresponding to the character input button 22 and the order designation button 23 displayed on the display 10. Also, because the user does not need to move the cursor to a desired input key by operating the remote controller when inputting characters, the trouble of moving the cursor when inputting characters using the remote controller 30 can be eliminated.

Consequently, the display 10 according to the embodiment of the present invention can easily input characters using the operation terminal without using a software keyboard on the display 10.

Although an example in which the remote controller 30 is used as an operation terminal has been described in the above-described embodiment, the present invention is not limited to such an example. For example, the operation terminal may be a smartphone, a tablet terminal, or the like.

When the operation terminal is a smartphone, a tablet terminal, or the like, the display 10 includes a communication unit for communicating with a smartphone, a tablet terminal, or the like instead of the remote controller signal reception unit 110 or in addition to the remote controller signal reception unit 110. The communication is performed through, for example, Bluetooth (registered trademark) or Wi-Fi (registered trademark).

The smartphone or the tablet terminal, for example, displays a screen operated by a user according to an application. The screen is, for example, a screen showing a button layout of the remote controller 30 in the above-described embodiment. By operating the screen, the user performs an operation similar to the operation of the remote controller 30 in the above-described embodiment.

The communication unit of the display 10 receives a signal corresponding to the operation from the smartphone, the tablet terminal, or the like every time the user operates the screen displayed on the smartphone, the tablet terminal, or the like.

Although an example in which the display device is a display has been described in the above-described embodiment, the present invention is not limited to such an example. For example, the display device may be a projection device such as a projector. When the display device is a projection device, the display unit 140 displays a screen by, for example, projecting onto a screen, a wall surface, or the like.

The embodiments of the present invention have been described above.

Also, all or some functions of the display 10 (the display device) according to the above-described embodiment may be implemented by a computer. In this case, the function may be implemented by recording a program for implementing the functions on a computer-readable recording medium and causing a computer system to read and execute the program recorded on the recording medium.

Also, the "computer system" used herein is assumed to include an operating system (OS) and hardware such as peripheral equipment. Also, the "computer-readable recording medium" refers to a flexible disk, a magneto-optical disc, a ROM, a portable medium such as a compact disc (CD)-ROM, or a storage device such as a hard disk embedded in the computer system. Furthermore, the "computer-readable recording medium" may include a computer-readable recording medium for dynamically holding the program for a short time period as in a communication line when the program is transmitted via a network such as the Internet or a communication circuit such as a telephone circuit and a computer-readable recording medium for holding the program for a given time period as in a volatile memory inside the computer system serving as a server or a client when the program is transmitted. Also, the above-described program may be a program for implementing some of the above-described functions. Furthermore, the above-described program may be a program capable of implementing the above-described function in combination with a program already recorded on the computer system or implementing the above-described function using a programmable logic device such as a field programmable gate array (FPGA).

Although embodiments of the present invention have been described in detail with reference to the drawings, specific configurations are not limited to those described above and various design changes and the like can be made without departing from the scope and spirit of the present invention.

Figure 10:
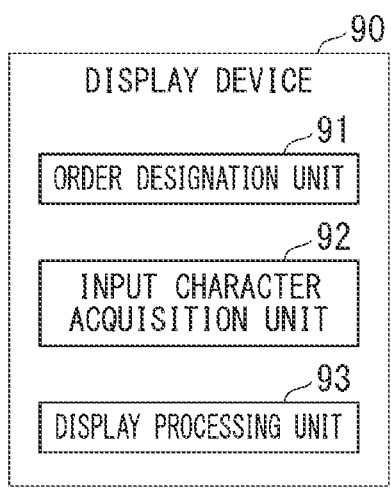
FIG. 10 is a block diagram showing a display device having a minimum configuration according to the embodiment of the present invention.

Furthermore, a display device 90 having a minimum configuration according to an embodiment of the present invention will be described with reference to FIG. 10. FIG. 10 is a block diagram showing the display device 90 of the minimum configuration according to the embodiment of the present invention.

As shown in FIG. 10, the display device 90 includes at least an order designation unit 91, an input character acquisition unit 92, and a display processing unit 93.

The display processing unit 93 displays character input buttons, each of which is assigned a plurality of characters, and an order designation button for designating the order of a character capable of being input among the characters assigned to the character input button.

The order designation unit 91 designates the order of the character capable of being input among the characters assigned to the character input button every time a button corresponding to the order designation button among buttons on the remote controller is pressed.

The input character acquisition unit 92 acquires the character corresponding to the order designated by the order designation unit among the characters assigned to the character input button corresponding to the pressed button as an input character when the button corresponding to the character input button among the buttons on the remote controller is pressed.

REFERENCE SIGNS LIST

10 Display
20 Input screen
30 Remote controller
110 Remote controller signal reception unit
120 Control unit
121 Order designation unit
122 Input character acquisition unit
123 Display processing unit
130 Storage unit
140 Display unit

What is claimed is:

1. A display device comprising:
a display processing unit configured to display character input buttons, each of which is assigned a plurality of characters, and an order designation button for designating the order of a character capable of being input among the characters assigned to the character input button;
an order designation unit configured to designate the order next to the currently designated order of a character capable of being input as the order of a character capable of being input among the characters assigned to the character input button every time a button corresponding to the order designation button among buttons on an operation terminal is pressed; and
an input character acquisition unit configured to acquire the character corresponding to the order designated by the order designation unit among the characters assigned to the character input button corresponding to the pressed button as an input character when the button corresponding to the character input button among the buttons on the operation terminal is pressed, and wherein the currently designated order of a character capable of being input is displayed on the order designation button by visualizing and indicating the order of a character capable of being input at present, and wherein marks equal in number to characters assigned to the character input button are displayed on the order designation button.

2. The display device according to claim 1, wherein the display processing unit displays the order designated by the order designation unit.

3. The display device according to claim 1, wherein the display processing unit displays the character corresponding to the designated order among the characters assigned to the character input button in accordance with the order of the character capable of being input designated by the order designation unit.

4. The display device according to claim 1, wherein the display processing unit displays a symbol indicating that a character has been input to an input field for the character without changing a display mode of the character input button corresponding to the pressed button when the button on the operation terminal corresponding to the character input button is pressed.

5. The display device according to claim 1, wherein the display processing unit displays the character corresponding to the designated order among the characters assigned to the character input button with respect to each of a plurality of character input buttons when the button on the operation terminal corresponding to the order designation button is pressed.

6. The display device according to claim 1, wherein the plurality of characters assigned to the character input button are displayed, in order, from left to right.

7. The display device according to claim 1, wherein the order designation button is separated from the character input buttons.

8. The display device according to claim 1, wherein the marks are arranged in a horizontal row.

9. The display device according to claim 1, wherein the marks are visually different based on a character capable of being input at present that has been designated and a character capable of being input at present that has not been designated.

10. A display method comprising:

displaying, by a display processing unit, character input buttons, each of which is assigned a plurality of characters, and an order designation button for designating the order of a character capable of being input among the characters assigned to the character input button;

designating, by an order designation unit, the order next to the currently designated order of a character capable of being input as the order of a character capable of being input among the characters assigned to the character input button every time a button corresponding to the order designation button among buttons on an operation terminal is pressed; and acquiring, by an input character acquisition unit, the character corresponding to the order designated by the order designation unit among the characters assigned to the character input button corresponding to the pressed button as an input character when the button corresponding to the character input button among the buttons on the operation terminal is pressed, and wherein the currently designated order of a character capable of being input is displayed on the order designation button by visualizing and indicating the order of a character capable of being input at present, and wherein marks equal in number to characters assigned to the character input button are displayed on the order designation button.

11. A non-transitory computer-readable storage medium that stores computer-executable programs that cause, when executed by one or more computers, the one or more computers to:

display character input buttons, each of which is assigned a plurality of characters, and an order designation button for designating the order of a character capable of being input among the characters assigned to the character input button;

designate the order next to the currently designated order of a character capable of being input as the order of a character capable of being input among the characters assigned to the character input button every time a button corresponding to the order designation button among buttons on an operation terminal is pressed; and acquire the character corresponding to the order designated by designating the order among characters assigned to the character input button corresponding to the pressed button as an input character when the button corresponding to the character input button among the buttons on the operation terminal is pressed, and wherein the currently designated order of a character capable of being input is displayed on the order designation button by visualizing and indicating the order of a character capable of being input at present, and wherein marks equal in number to characters assigned to the character input button are displayed on the order designation button.

* * * * *